(12) United States Patent
Herrmann

(10) Patent No.: US 8,098,771 B2
(45) Date of Patent: Jan. 17, 2012

(54) RECEIVER APPARATUS AND METHOD FOR RECEIVING DATA UNITS OVER A CHANNEL

(75) Inventor: Christoph Herrmann, Aachen (DE)

(73) Assignees: Koninklijke Philips Electronics, N.V., Eindhoven (NL); Sharp Corporation, Osaka (JP)

( * ) Notice: Subject to any disclaimer, the term of this patent is extended or adjusted under 35 U.S.C. 154(b) by 1139 days.

(21) Appl. No.: 11/909,472

(22) PCT Filed: Mar. 14, 2006

(86) PCT No.: PCT/IB2006/050792
§ 371 (c)(1),
(2), (4) Date: Sep. 24, 2007

(87) PCT Pub. No.: WO2006/103576
PCT Pub. Date: Oct. 5, 2006

(65) Prior Publication Data
US 2010/0172445 A1 Jul. 8, 2010

(30) Foreign Application Priority Data
Mar. 29, 2005 (EP) ..................................... 05102446

(51) Int. Cl.
*H04L 27/06* (2006.01)

(52) U.S. Cl. ...................................................... 375/340

(58) Field of Classification Search .................. 370/231, 370/350, 468; 375/340
See application file for complete search history.

(56) References Cited

U.S. PATENT DOCUMENTS

| 2003/0214906 A1 | 11/2003 | Hu et al. |
| 2004/0208160 A1 | 10/2004 | Petrovic et al. |
| 2007/0263631 A1* | 11/2007 | Mallory ........................ 370/394 |

FOREIGN PATENT DOCUMENTS

| WO | WO03058852 A1 | 7/2003 |
| WO | WO-03058852 A1 * | 7/2003 |
| WO | WO03096600 A1 | 11/2003 |
| WO | WO2004019543 A1 | 3/2004 |
| WO | WO2004042993 A1 | 5/2004 |

OTHER PUBLICATIONS

"Universal Mobile Telecommunications System (UMTS); Medium Access Control (MAC) Protocol Specification (3GPP TS 25.321, Version 6.3.0 Release 6)", ETSI Standards Institute, Dec. 2004.

(Continued)

*Primary Examiner* — David C. Payne
*Assistant Examiner* — Leon-Viet Nguyen

(57) ABSTRACT

When transmitting medium access control protocol data units for the high speed downlink shared channel over a plurality of hybrid automatic repeat request processes, one of the processes can be in a retransmission procedure. In this case, stalling of the transmission can occur, because the medium access control layer for the high speed downlink shared channel of the receiver apparatus (3) buffers the following packet data units, when a preceding protocol data unit is waiting in the stalled process. To enable an early processing of the already received data, the receiver apparatus determines, whether the next expected service data units for a higher layer such as a radio link control layer, are included in the already received packet data units by taking into account the sequence number for the higher layer. Therefore, the medium access control layer for the high speed downlink shared channel accesses the data of the service data unit for the higher layer.

11 Claims, 3 Drawing Sheets

OTHER PUBLICATIONS

"Universal Mobile Telecommunications System (UMTS); Medium Access Control (MAC) Protocol Specification (3GPP TS 25.321 Version 5.7.0 Release 5)", ETSI Standards Institute, Dec. 2003.

"Universal Mobile Telecommunications System (UMTS); Utra High Speed Downlink Packet Access (HSPDA); Overall Description; Stage 2 (3GPP TS 25. 308 Version 5.2.0 Release 5)", ETSI Standards Institute, Mar. 2002.

"Universal Mobile Telecommunications System (UMTS); Radio Link Control (RLC) Protocol Specification (3GPP TS 25.322 Version 5.2.0 Release 5)", ETSI Standards Institute, Sep. 2002.

"Universal Mobile Telecommunications System (UMTS); Radio Link Control (RLC) Protocol Specification (3GPP TS 25.322 Version 3.17.0 Release 1999)", ETSI Standards Institute, Dec. 2003.

* cited by examiner

RECEIVER APPARATUS AND METHOD FOR RECEIVING DATA UNITS OVER A CHANNEL

The present invention relates to an apparatus and method for receiving data units over a channel. More particularly, the present invention relates to a receiver apparatus and method for receiving data units over a high speed downlink shared channel of wireless communication systems according to 3rd Generation standards of the Universal Mobile Telecommunication System (UMTS).

State of the art document WO 2004/019543 A1 describes a method of hybrid automatic repeat request process configuration in a mobile communication system. Thereby, a plurality of hybrid automatic repeat request (HARQ) processes transmit data packets from a transmitter to a receiver, one of which is reserved for specific data flows of high priority. More state of the art information can be found in "3GPP TS 25.321 V5.7.0 (2003-12) Technical Specification 3rd Generation Partnership Project; Technical Specification Group Radio Access Network; Medium Access Control (MAC) protocol specification (Release 5)", "3GPP TS 25.308 V5.2.0 (2002-03), Technical Specification, 3rd Generation 15 Partnership Project; Technical specification Group Radio Access Network; High Speed Downlink Packet Access (HSDPA); Overall description; Stage 2 (Release 5)", which are both hereby incorporated by reference" as well as in WO 2004/042993.

The methods as described in the above and other references have the following disadvantage explained in some details in the following:

According to these methods, data is transmitted in the downlink, i.e. from the UMTS transmitter in the Node B to the receiver in the UMTS mobile station or UE (user equipment) via the high speed downlink shared channel (HS-DSCH) at high speed. In a sub-layer of the MAC layer, the so-called MAC-hs layer (hs: high speed), a HARQ retransmission protocol controls the retransmission of MAC-hs PDUs. At the receiver in the mobile station, the soft-bits of a retransmitted MAC-hs PDU are soft-combined with the soft-bits of an earlier transmission of this MAC-hs PDU. The MAC-hs layer is located on the Node B. The peer entities of the HARQ retransmission protocol are hence located on the Node B and the mobile station or UE.

In addition to the HARQ retransmission protocol, there is a second protocol, which is relevant in the context of the present invention: It is the so-called Radio Link Control (RLC) protocol, the peer entities of which are located on the mobile station's serving RNC (radio network controller) and the mobile station. For the details of the Radio Link Control protocol (RLC protocol) e.g. acknowledged mode (AM) and unacknowledged mode (UM) data transmission, 3GPP TS 25.322 V5.2.0 (2002-09) Technical Specification 3rd Generation Partnership Project; Technical Specification Group Radio Access Network, which is herewith incorporated by reference. This RLC protocol is in charge of performing segmentation of RLC SDUs (service data units, i.e. data units, which are received from the next higher layer above the RLC layer) into fragments, which are sent as part of an RLC PDU (protocol data unit, i.e. a data unit, which the RLC layer hands down to the next lower layer, which is here the MAC layer), and, if applicable, concatenation of different RLC SDUs or fragments of different RLC SDUs into RLC PDUs, and (if configured accordingly) controlling retransmission of RLC PDUs, which the receiver indicates to the transmitter as not having been correctly received.

If data is transmitted via the HS-DSCH, these data are also always processed by an RLC protocol entity above the HARQ protocol, and this RLC protocol entity can then be configured for Acknowledged mode (AM) data transmission, or Unacknowledged mode (UM) data transmission.

"Acknowledged mode data" is also abbreviated by AMD, "Unacknowledged mode data" by UMD. In both UMD and AMD transmission, the RLC PDUs have a sequence number, where UM prescribes 7 bits and AM prescribes 12 bits for coding the sequence number. This corresponds to a sequence number range from 0 to 127 for UM, and from 0 to 4095 for AM. If configured for AMD transmission, the RLC protocol performs segmentation (and, if applicable, concatenation) of RLC SDUs into RLC PDUs, and improves reliability of data transmission by performing retransmissions. If configured for UMD transmission, the RLC protocol only performs segmentation and, if applicable, concatenation. On the transmitting side, an RLC PDU is further processed by the MAC layer, or more precisely the MAC-d layer, which may add a MAC header, if dedicated logical channels have to be distinguished. This MAC header identifies the dedicated logical channel, on which the RLC PDU is transmitted. The MAC-d PDU (i.e. the protocol data unit produced by the MAC-d layer) is then delivered to the MAC-hs layer located on the Node B of the UMTS. Here, one or more MAC-d PDUs destined for the same mobile station are compiled into a MAC-hs PDU. These MAC-d PDUs may belong to different logical channels, i.e. have different MAC headers. Hence, the MAC-hs PDU multiplexes MAC-d PDUs of different logical channels, however, for the same receiving mobile station. In contrast to that, one MAC-d PDU always contains exactly one RLC PDU.

A MAC-hs PDU compiled from one or more MAC-d PDUs, is further processed by the physical layer and then transmitted via the High Speed Downlink Shared Channel.

As visible from the above, a MAC-hs PDU, which is destined to a particular UE, multiplexes MAC-d PDUs of different logical channels, in other words, at some point in time one MAC-hs PDU may contain MAC-d PDUs of different logical channels, while at other points in time it only contains MAC-d PDUs of the same logical channel.

The MAC-hs layer in the UE has to take care of receiving MAC-hs PDUs in sequence. The MAC-hs PDU sequence may be changed due to the fact that several HARQ processes on the base station independently send MAC-hs PDUs of the same priority class to a particular UE. For this a reordering entity is available on the UE (one for each priority class) provided with a reordering window and a reordering timer, by which the receiving MAC-hs entity on the UE enforces that only MAC-hs PDUs which are in the correct sequence, are further processed, i.e. are disassembled so that the MAC-d PDUs contained in these MAC-hs PDUs are only delivered to the next higher sub-layer (i.e. the MAC-d layer), if the processed MAC-hs PDUs all have Transmission Sequence Numbers (TSNs), which are the expected ones, i.e. in sequence. In order to identify MAC-hs PDUs, which are not the expected ones, the receiving MAC-hs layer maintains a counter, which indicates the TSN of the next expected MAC-hs PDU, and if a MAC-hs PDU with this particular TSN is received, the counter is incremented by 1.

Since the MAC-hs entity on the UE enforces that only MAC-hs PDUs, which are in the correct sequence, are further processed, there is the following disadvantage, which translates into increased processing delay: Since the MAC-hs PDU in general contains MAC-d PDUs of different logical channels, it may well happen that all contained (first) MAC-d PDUs of one or more logical channels are in sequence, while second MAC-d PDUs of other logical channels contained in the same MAC-hs PDU are not in sequence. Hence, the first MAC-d PDUs are not processed—although they could be without any problem for the receiving RLC entity that processes the RLC PDUs contained in the first MAC-d PDUs—just because the second MAC-d PDUs are not in sequence. Consequently, the RLC entities on the UE, which are to further process the RLC PDUs contained in these first MAC-d PDUs unnecessarily wait for these RLC-PDUs (contained in the first MAC-d PDUs), which naturally causes unnecessary delay.

It is an object of the invention to provide an apparatus and method for receiving data units with an improved processing delay performance.

This object is solved by a receiver apparatus as defined in claim 1 and by a receiving method as defined in claim 11.

The main idea is to make available a subset of information known to the RLC layer also in the MAC-hs layer so that the MAC-hs layer can already decide on whether RLC-PDUs contained in MAC-d PDUs, which are received in a MAC-hs PDU, are in sequence and therefore can already be delivered to the RLC entity that processes these RLC-PDUs. This subset of information may comprise, for each logical channel, and therefore for the associated RLC entity, at least the next expected sequence number of the RLC entity, which sequence number is part of the RLC header of the RLC PDU. It should be noted that this sequence number (SN) is different from the transmission sequence number (TSN), which is part of the MAC-hs header, i.e. belongs to the MAC-hs PDU.

The term "output at least indirectly" as used in claims 1 through 11 covers "output directly" and "output indirectly".

The term "output directly" is meant to indicate that the lower layer that outputs data directly towards the higher layer is followed by this higher layer, without any intermediate layer. Accordingly, the term "output indirectly" covers the case that there is an intermediate layer between the lower layer and the higher layer, and the data output by the lower layer passes at least the intermediate layer or is processed by the intermediate layer.

Advantageous developments of the invention are mentioned in the dependent claims.

The present invention has the further advantage that an improved processing of data units waiting in the reordering buffer of the lower layer is enabled. Thereby, a channel-dependent decision is made with respect to the protocol data units for the higher layer. For example, when one or more protocol data units of the lower layer are missing in the sequence of received protocol data units for the lower layer, then the received protocol data units are buffered until the missing data units are received. It is possible to provide some means to limit the buffering of received data units, such as a reordering timer or a reordering window, but these means are provided as long time limitations to avoid unnecessary requests for retransmission of missing data units. Hence, in this case processing of the data units is delayed, even when means such as a reordering timer or a reordering window are provided. But, even if some protocol data units are missing in the sequence of protocol data units of the lower layer, the buffered protocol data units of the lower layer can already contain a continuous series of service data units for a specific logical channel, i.e., a specific higher layer protocol entity. Hence, at least the service data units to build up the higher layer protocol data units are forwarded to the higher layer protocol entity, so that the processing of higher layer protocol data units is enabled, before the missing protocol data units are received by the lower layer, and even if these protocol data units never arrive. Thereby, the lower layer takes into account the sequence number or some other information stored in the higher layer service data units of the protocol data unit of the lower layer.

Thereby, it is to be noted that the term "sequence number" is not limited to a series of integers and can be represented by some other information, a combination of characters and digits, for example.

The measure as defined in claim 2 has the advantage that the data units can be sent to a higher layer, which is not directly above the lower layer. It is also possible, that further intermediate layers are provided.

The measure as defined in claim 3 has the advantage that the already received data units for the higher layer protocol entity can be processed without influencing the process of other logical channels, that means other higher layer protocol entities. Hence, the generation of unnecessary status reports or requests for retransmission is prevented.

According to the measures as defined in claims 4, 5 and 6, the lower layer, the intermediate layer and the higher layer can be arranged as layers of a receiver apparatus for an universal mobile telecommunication system terrestrial radio access network (UTRAN). Thereby, the receiver apparatus can be arranged as a part of the mobile equipment of a user equipment according to 3rd Generation standards.

According to the measures as defined in claims 7 and 8 the lower layer is informed about the next expected sequence number for the higher layer protocol entity from the intermediate layer, and the intermediate layer requests the next expected sequence number from the higher layer protocol entity to which it has assigned the channel identification number received from the lower layer. Therefore, the requests follow the logical structure of the different layers of the receiver apparatus.

According to the measures as defined in claims 9 and 10 the higher layer protocol entity is informed about its channel identification number. A higher layer protocol entity does not necessarily know about its own channel identification number, because the intermediate layer handles the respective logical channels. When the higher layer protocol entity knows or is informed about its channel identification number, it can answer a request from the lower layer made with respect to the channel identification number of the higher layer protocol entity.

Thereby, the measures as defined in claims 7 and 8, and 9 and 10, are advantageous, when a plurality of higher layer protocol entities, perhaps with varying channel identification numbers, are provided, which are connected with the lower layer via one or more intermediate layers. Thereby, a plurality of intermediate layers may be arranged parallel and/or serial between the lower layer and the plurality of higher layer protocol entities.

These and other aspects of the invention will be apparent from and elucidated with reference to the embodiments described hereinafter.

The present invention will become readily understood from the following description of preferred embodiments thereof made with reference to the accompanying drawings, in which like parts are designated by like reference signs and in which.

Figure 1:
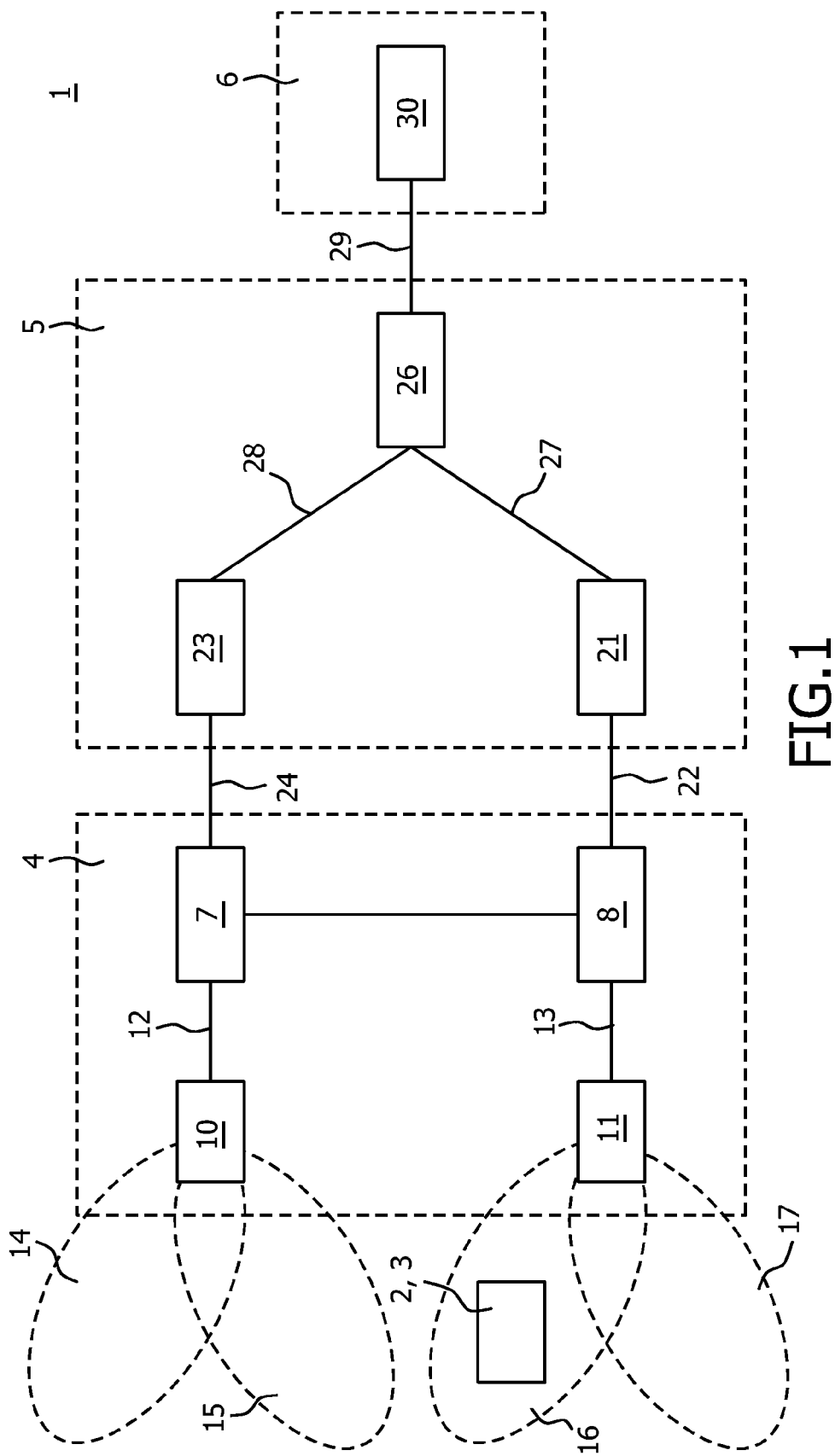
FIG. 1 shows a schematic view of network elements of a mobile network according to preferred embodiments of the present invention.

FIG. 1 shows a schematic view of network elements of a mobile network 1 according to preferred embodiments of the invention. The mobile network 1 can be arranged for wireless communications systems according to 3rd Generation standards. Therefore, the receiver apparatus 2, which is a part of a user equipment 3, is described in the following with respect to a downlink transmission from an universal mobile telecommunication system terrestrial radio excess network 4 connected via a core network 5 to an external network 6. But, the receiver apparatus 2 and the receiver method are also applicable for other environments, and can be included in or processed by other types of equipment.

Figure 2:
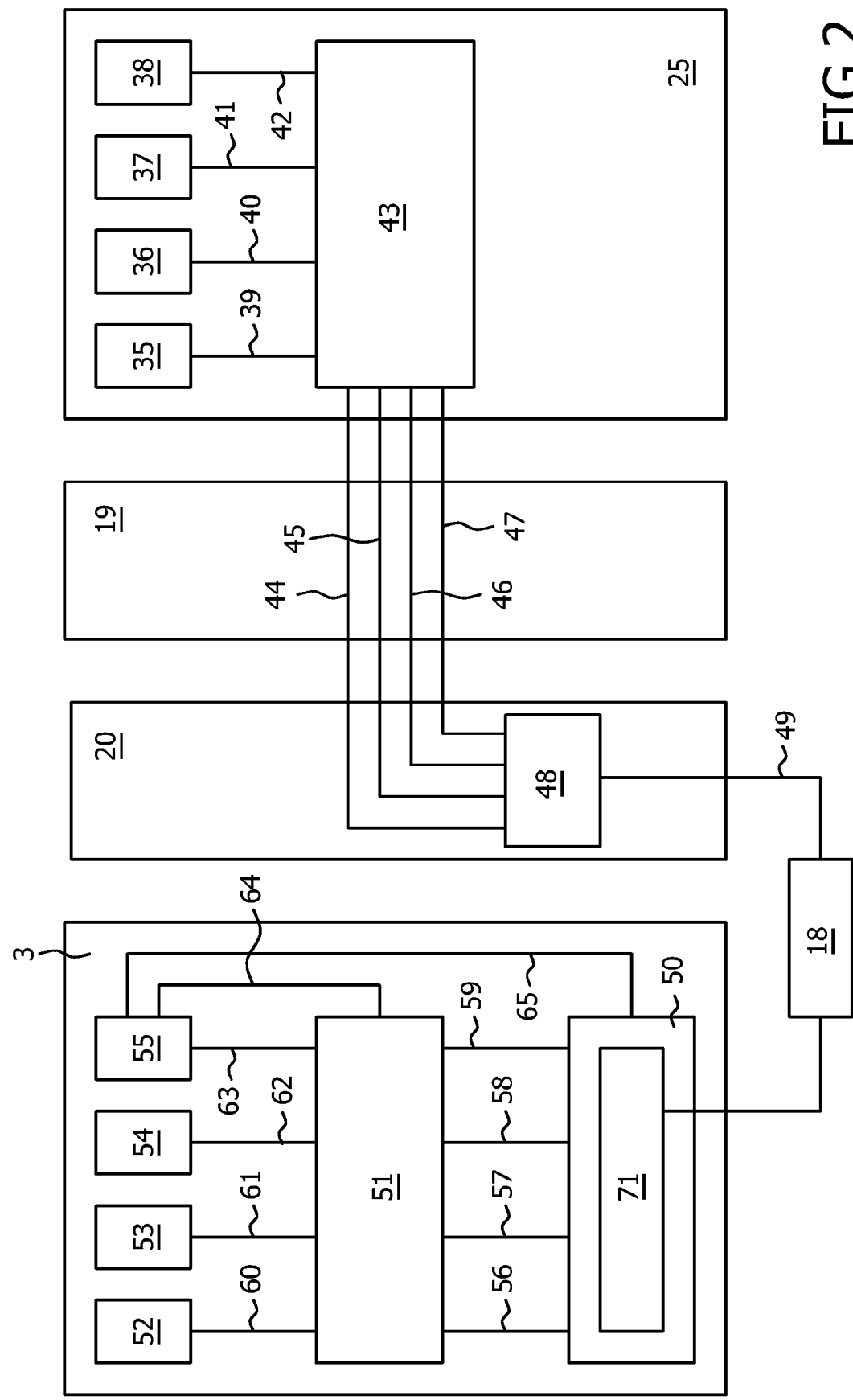
FIG. 2 shows the network elements, as shown in FIG. 1, in further detail according a first embodiment of the present invention.

The network 4 comprises radio network controllers 7, 8, wherein the radio network controller 7 is connected with the radio network controller 8 over an interface 9. Further, the network 4 comprises base stations 10, 11, wherein the base station 10 is connected to the radio network controller 7 over an interface 12, and the base station 11 is connected to the radio network controller 8 over an interface 13. The base station 10 provides services for cells 14, 15, and the base station 11 provides services for cells 16, 17. The user equipment 3 is located in the area of the cell 16 so that the user equipment 3 is connected to the base station 11 over an air interface 18 (shown in FIG. 2). Thereby, the base station converts the data flow between the interface 13 and the air interface 18. When the user equipment 3 leaves the area of cell 16 and enters the area of cell 15, the data flow from the radio network controller 8 is directed over the interface 9 to the radio network controller 7, and then the radio network controller 7 converts the data flow between the interface 9 and the interface 12 so that the data flow from interface 9 is forwarded to the interface 12. The radio network controller 7 is then acting as a drift radio network controller 19 (shown in FIG. 2) and the base station 10 converts the data flow between the interface 12 and the air interface 18 so that the base station 20, as shown in FIG. 2, is represented by the base station 10. If the drift radio network controller 19 is left out, and the data flow is directly transmitted over the radio network controller 8 to the base station 11 over the interface 13, then the base station 20, as shown in FIG. 2, is represented by the base station 11.

The radio network controller 8 is connected to a serving general packet radio service support node 21 over an interface 22. The radio network controller 7 is also connected to a serving general packet radio service support node 23 (SGSN) over an interface 24. When the data flow is directed over the support node 23 and the interface 24 to the radio network controller 7, then the radio network controller 7 is itself acting as a serving radio network controller 25 (SRNC) (shown in FIG. 2), and in this case, if the data flow is directed from the interface 24 towards the radio network controller 8 over the interface 9 to connect to the user equipment 3 located in the cell 16, the radio network controller 8 is acting as a drift radio network controller 19 (DRNC).

The support nodes 21, 23 of the core network are usually used for packet switched services. But, instead of the serving general packet radio service support nodes 21, 23 another means such as a mobile service switching center or a visitor location register can be provided.

The support nodes 21, 23 are connected to a gateway general packet radio service support node 26 (GGSN) via interfaces 27, 28, respectively. The support node 26 is the switch at the point, where the core network 5 is connected to the external network 6. Hence, all incoming and outgoing packet switched services connections go through the support node 26. In the preferred embodiment shown in FIG. 1, the support node 26 is connected over an interface 29 to a server 30 of the external network 6. The server 30 provides connections for packet data services such as the internet. But, the support note 26 can also be arranged as a switch to an external circuit switched network 6. In this case, the server 30 provides circuit switched connections such as the integrated services digital network telephony service or the public switched telephone network.

FIG. 2 shows network elements of the mobile network according to the first preferred embodiment of the present invention in further detail. Thereby, the serving radio network controller is connected via the drift radio network controller 19 with the base station 20. As described with reference to FIG. 1, depending on the location of the user equipment 3, it is also possible that the serving radio network controller 25 is directly connected to the base station 20, or in other words the role of DRNC and SRNC is represented by the same radio network controller. To simplify the description, the functionality of the drift radio network controller 19 is only shown as a throughput, but the drift radio network controller 19 can also convert the data flow between the serving radio network controller 25 and the base station 20.

The serving radio network controller 25 comprises a plurality of radio link control entities 35, 36, 37, 38 connected over interfaces 39, 40, 41, 42 to a medium access control layer 43 for the dedicated logical channels. Thereby, the radio link control (RLC) entities 35, 36, 37, 38 provide logical channels and the medium access control layer 43 for the dedicated logical channels is responsible for handling dedicated logical channels allocated to the user equipment 3 in connected mode. The medium access control layer 43 is connected via interfaces 44, 45, 46, 47 with a medium access control 48 for the high speed downlink shared channel 49. Thereby, the base station 20 is connected to the user equipment 3 over the air interface 18.

The user equipment 3 comprises at least a lower layer 50, an intermediate layer 51 and a higher layer containing protocol entities 52, 53, 54, 55. The lower layer 50 is adapted to the medium access control 48 and can also be arranged as a medium access control for the high speed downlink shared channel 49. The intermediate layer 51 is adapted to the medium access control layer 43 for the dedicated logical channels and can also be arranged as a medium access control for the dedicated logical channels. Each of the higher layer protocol entities 52, 53, 54, 55 represents the peer-entity of the radio link control (RLC) entity 35, 36, 37, 38, respectively.

The lower layer 50 is connected via local interfaces 56, 57, 58, 59 with the intermediate layer 51. The intermediate layer 51 is connected via interfaces 60, 61, 62, 63 with the higher layer protocol entities 52, 53, 54, 55, respectively. Further, according to the first preferred embodiment of the present invention, the higher layer protocol entity 55 is connected via an interface 64 with the intermediate layer 51, and the higher layer protocol entity 55 is connected over a further interface 65 with the lower layer 50. The other protocol entities of the higher layer 52, 53, 54 are also connected with the intermediate layer 51 and the lower layer 50 by interfaces (not shown) corresponding to the interfaces 64, 65.

On request of the lower layer 50, sent to the higher layer protocol entity 55 over the interface 65, the higher layer protocol entity 55 responds with the next expected sequence number, if the channel identification number transmitted in the request from the lower layer 50 equals the channel identification number of the higher layer protocol entity 55. To be informed about the channel identification number, the higher layer protocol entity 55 requests its channel identification number from the intermediate layer 51 over the interface 64. Hence, even if the medium access control layer 43 for the dedicated logical channels is instructed by the Radio Resource Control entity (RRC) to vary the channel identification number for the radio link control (RLC) entities 35, 36, 37, 38 on the side of the serving radio network controller 25 (the transmitter side), the higher layer protocol entity 55 is informed (via the RRC entity on the UE) about its actual channel identification number from the intermediate layer 51 of the user equipment 3 of the receiver apparatus 2.

Figure 3:
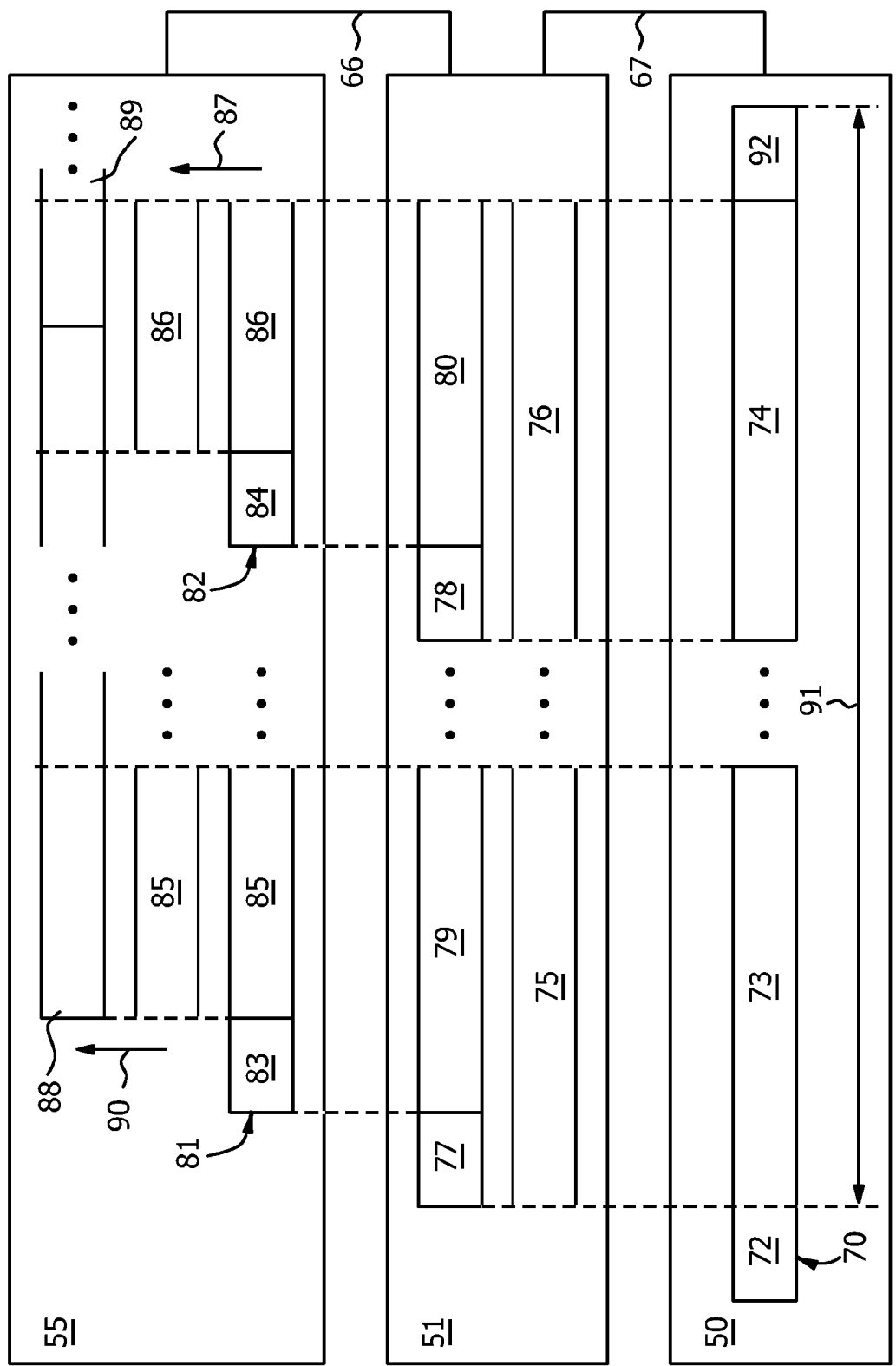
FIG. 3 shows the part of the receiver apparatus shown in FIG. 2 in further detail according to a second embodiment of the present invention.

The functionality on the user equipment side 3 will become readily understood from the following detailed description of the second preferred embodiment of the present invention made with reference to FIG. 3.

FIG. 3 shows the lower layer 50, the intermediate layer 51 and the higher layer protocol entity 55 of the user equipment 3 according to a second preferred embodiment of the present invention in further detail focusing at the service data units and the protocol data units, which are processed in the different layers. Thereby, according to the second preferred embodiment, the higher layer protocol entity 55 is connected via an interface 66 with the intermediate layer 51, and the intermediate layer 51 is connected with the lower layer 50 via an interface 67. On request of the lower layer 50 over the interface 67, the intermediate layer 51 responds the next expected sequence number for the higher layer protocol entity 55. The intermediate layer 51 receives this next expected sequence number from the higher layer protocol entity 55 on request transmitted to the higher layer protocol entity 55 over the line 66. Thereby, the intermediate layer 51 assigns to each of the higher layer protocol entities 52, 53, 54, 55 an individual channel identification number, so that the intermediate layer 51 can send the request for the next expected sequence number made with respect to the request from the lower layer 50 that includes the channel identification number, to the appropriate higher layer protocol entity 52, 53, 54, 55.

The lower layer 50 receives a service data unit over the downlink shared channel 49, and this service data unit is stored as a protocol data unit 70 of the lower layer 50 in a reordering buffer 71 (FIG. 2). The protocol data unit 70 comprises a lower layer header information 72 that is readable by the lower layer 50. The lower layer header information 72 comprises, for example, a transmission sequence number to enable the lower layer to reorder the received protocol data units of the downlink shared channel, if, for example, data is sent over a plurality of hybrid automatic repeat request processes. Specifically, the base station 20 can send over the high speed downlink shared channel 49 with up to 8 processes implementing hybrid automatic repeat request type II or III procedures. The data units received from the lower layer 50 of the user equipment 3 are not necessarily received in the same order as sent from the base station 20. For example, one of the hybrid automatic repeat request processes may be in a retransmission procedure, so that this process is stalled, i.e. has to wait until transmission of the protocol data unit has been confirmed by a positive acknowledgement (ACK) from the lower layer of the user equipment 3. The data units sent over the other processes can then overhauling the data units waiting in the stalled process.

In the UMTS, the lower layer may be given by the MAC-hs sub-layer of the Medium Access Control (MAC) layer.

The reordering buffer 71 is arranged to buffer a plurality of protocol data units 70. When the transmission sequence number of the lower layer header information 72 is detected from the lower layer 50 as the next expected transmission sequence number, then the service data units 73, 74 included in the protocol data unit 70 are output to the intermediate layer 51. The intermediate layer 51 receives the service data unit 73 of the lower layer 50 as a protocol data unit 75 for the intermediate layer. Further service data units denoted by the three dots and the service data unit 74 are sent to the intermediate layer 51 and received by the intermediate layer 51 as protocol data units for the intermediate layer, as shown by the three dots and the protocol data unit 76. The received protocol data units 75, 76 are split up in the intermediate layer 51. Thereby, the protocol data unit 75 comprises an intermediate layer header information 77 and a service data unit 79. The protocol data unit 76 comprises an intermediate layer header information 78 and a service data unit 80. The intermediate layer header information 77, 78 comprises, for example, a channel identification number, so that each of the service data units 79, 80 can be assigned to a specific higher layer protocol entity 52, 53, 54, 55. In FIG. 3, the channel identification number stored in the intermediate layer header information 77 and the channel identification number stored in the intermediate layer header information 78 assign both the service data unit 79 and the service data unit 80 to the higher layer protocol entity 55. Therefore, the service data unit 79 and the service data unit 80 are output to the higher layer protocol entity 55, and received by the higher layer protocol entity 55 as protocol data units 81, 82.

In the UMTS, the intermediate layer may be represented by the Medium Access Control (MAC) layer, or more precisely by the MAC-d layer, i.e. the MAC sub-layer dealing with data packets sent via dedicated logical channels. Accordingly, the intermediate layer header may be represented by the MAC-d header.

On the RAN side, this layer is located on the SRNC.

The protocol data units 81, 82 comprise higher layer header information 83, 84, respectively. The higher layer header information 83 comprises a sequence number for the higher layer protocol entity 55, which in case of the UMTS is an RLC (Radio Link Control) protocol entity. The higher layer protocol entity 55 compares the sequence number of the protocol data unit 81 with the sequence number of the protocol data unit 82 and, if the occasion arises, reorders the protocol data units 81, 82 with respect to their sequence numbers. Further, the higher layer protocol entity 55 determines, whether a protocol data unit 81, 82 has been received, the sequence number of which equals the next expected sequence number for the higher layer protocol entity 55.

The next expected sequence number for the higher layer protocol entity 55 can be determined in different ways. For example, the higher layer protocol entity 55 can define a window of allowed sequence numbers. If protocol data units 81, 82 are received by the higher layer protocol entity 55, and the sequence numbers of the received protocol data units 81, 82 build up a sequence beginning at the lower bound of the window, the protocol data units 81, 82 are considered as being in the required sequence, then the payload data 85, 86 are extracted as shown by the arrow 87. Then, the window is shifted upwards so that the lower bound of the window equals the number following the last in-sequence sequence number of received protocol data units. And, receipt of the sequence numbers is confirmed in a confirmation or status report sent back via the base station 20 to the serving radio network controller 25, or more precisely to the corresponding higher layer (RLC) protocol entity 35, 36, 37 or 38, on the serving radio network controller 25. This case refers to the so-called Acknowledged Mode Data (AMD) transmission RLC protocol in UMTS, which allows for transmitting data packets with retransmission functionality. In a protocol entity of the AMD RLC protocol the lower bound of the window of sequence numbers represents the next expected sequence number of this AMD RLC protocol entity. In "3GPP TS 25.322 V3.17.0 (2003-12) Technical Specification 3rd Generation Partnership Project; Technical Specification Group Radio Access Network; Radio Link Control (RLC) protocol specification (Release 1999)", which is incorporated herewith by reference, this lower bound of the reception window is given by the state variable VR(R).

Another way to define the next expected sequence number is a counter the initial value of which is defined to be 0, which counter is incremented by 1 if the higher layer protocol entity receives a protocol data unit 81 from the layer below, the sequence number of which protocol data unit equals the value of the counter before receiving this protocol data unit. Hence, the counter value corresponds to the sequence number following that of the last protocol data unit received. In the UMTS, the state variable VR(US) of the Unacknowledged Mode Data (UMD) transmission RLC protocol (as defined in TS 25.322) corresponds to this counter value.

Accordingly, the higher layer protocol entities 52, 53, 54, 55 may be configured as an UM RLC protocol entity, defining the next expected sequence number by means of the state variable VR(US).

But, the present invention is not limited to such concepts and the next expected sequence number can also be determined by any other concept.

The payload data 85, 86 and possibly other payload data received earlier or later are then reassembled to service data units 88, and possibly 89 of the higher layer protocol entity 55. It is to be noted that the payload data 86 may be split up in two parts, and one part of the payload data 86 is reassembled together with the payload data 85 and other payload data, as shown by the three dots, to the service data unit 88, while the other part of the payload data 86 is reassembled with other following payload data to the service data unit 89. The reassembly procedure is shown by the arrow 90 in FIG. 3.

The reassembly procedure is the inverse operation to the segmentation and concatenation procedure performed in at least some RLC entities 35, 36, 37, 38. That means, for example, in the radio link control entity 38 service data units 88, 89 are input, and the length of the service data unit 88 is not an integer multiple of the length of each of the payload data 85, 86 segments. Hence, a part of the payload data 86 is filled up by a segment of the following service data unit 89. Hence, each of the service data units 88, 89 is segmented on the side of the radio link control entities 38, and for the payload data 86 a concatenation occurs.

Therefore, the service data units 88, 89 output from the higher layer protocol entity 55 are recovered and comprise the same data as the respective service data units input to the radio link control 38.

The payload data 85, 86 is ciphered in the radio link control layer 38, excluding the two first octets, which comprise the protocol data unit sequence number and a poll bit. The protocol data unit sequence number is one input parameter to the ciphering algorithm, and it must be readable by the higher layer 55 to be able to perform deciphering. Hence, the sequence number for the higher layer protocol entity 55 is readable by the lower layer 50, and also by the intermediate layer 51.

When the packet data unit 70 is received by the lower layer 50 and the transmission sequence number for the lower layer 50 is not the next expected transmission sequence number for the lower layer 50, then the protocol data unit 70 is buffered in the reordering buffer 71. Then, the lower layer 50 determines the sequence numbers of all RLC protocol data units contained in the packet data unit 70, i.e. the sequence numbers, which the higher layer protocol entity 55, and possibly the other higher layer protocol entities 52, 53 or 54 has to process. The sequence number is stored in the higher layer header information 83, which is a part of the intermediate layer 51 service data unit 79 of the lower layer 50 service data unit 73. The sequence number for the higher layer protocol entity 55 is not ciphered and therefore transparent for the lower layer 50. Hence, the lower layer 50 can detect from the structure of the header information for the intermediate layer 51 and the higher layer protocol entity 55 the position of the sequence number for the higher layer protocol entity 55 in the service data unit 73. Then, the lower layer 50 reads out from the service data unit 73 the sequence number for the higher layer protocol entity 55 together with the channel information. Then, the lower layer 50 may send a request to the intermediate layer 51 via the interface 67 on the basis of the channel information. The intermediate layer 51 may answer this request with the next expected sequence number for the higher layer protocol entities 52, 53, 54, 55 associated with this channel information.

Thereafter, the lower layer 50 determines, whether the sequence number for the higher layer protocol entity 55 read out from the service data unit 73 equals the next expected sequence number for the higher layer protocol entity 55. If this determination is answered in the affirmative, then the service data unit 73 is sent to the intermediate layer 51 for further processing, while the remaining service data units, which are found to be not in sequence are kept in the lower layer service data unit 73 in the reordering buffer.

The described procedure is then repeated for all further service data units such as the service data unit 74. Thereby, the described steps can also be performed in an other order so that, for example, if the occasion arises, all service data units 73, 74 of one of the protocol data unit 70 are output to the intermediate layer 51 in parallel.

Then, the payload data 91 of the lower layer 50 protocol data unit 70 is checked. Thereby, the payload data 91 comprises a padding field 92 to fit a preset size for the payload data 91.

An alternative way of handling the higher layer sequence numbers in the lower layer may be that for each identified logical channel an own counter for the higher layer sequence number is instantiated so that it is not necessary to communicate with the higher layer protocol entity (RLC entity) for each service data unit contained in the lower layer packet data unit.

Although an exemplary embodiment of the invention has been disclosed, it will be apparent to those skilled in the art that various changes and modifications can be made, which will achieve some of the advantages of the invention without departing from the spirit and scope of the invention. Such modifications to the inventive concept are intended to be covered by the appended claims in which the reference signs shall not be construed as limiting the scope of the invention. Further, in the description and the appended claims the meaning of "comprising" is not to be understood as excluding other elements or steps. Further, "a" or "an" does not exclude a plurality, and a single processor or other unit may fulfill the functions of several means recited in the claims.

The invention claimed is:

1. A receiver apparatus for receiving data units over at least a channel, wherein said receiver apparatus comprises a lower layer and a higher layer with at least a higher layer protocol entity, said higher layer protocol entity is assigned to said lower layer, said lower layer comprises a reordering buffer to buffer at least a data unit input to said lower layer as a protocol data unit, and said lower layer is adapted to output at least a part of said data unit at least indirectly to said higher layer as a service data unit, when said lower layer detects said data unit as a next expected protocol data unit, said lower layer is adapted to detect a sequence number for said higher layer protocol entity, which sequence number is included in said data unit buffered in the reordering buffer, and said lower layer is adapted to output at least a part of said data unit buffered in said reordering buffer at least indirectly to said higher layer protocol entity as a service data unit, when said lower layer detects that said sequence number for said higher layer protocol entity is regarded as a next expected sequence number for said higher layer protocol entity.

2. The receiver apparatus as claimed in claim 1, wherein said receiver apparatus further comprises an intermediate layer which is adapted to receive said service data unit sent from said lower layer as a protocol data unit, to determine at least a part of said protocol data unit that is intended for said higher layer protocol entity, and to send said part of said protocol data unit intended for said higher layer protocol entity to said higher layer protocol entity as a service data unit.

3. The receiver apparatus as claimed in claim 2, characterized in that said lower layer is adapted to send a copy of said part of said data unit buffered in said reordering buffer to said intermediate layer as a protocol data unit for said intermediate layer, when said lower layer detects that said sequence number for said higher layer protocol of entity is regarded as said next expected sequence number for said higher layer protocol entity, and that said intermediate layer is adapted to process said part of said protocol data unit that is intended for said higher layer protocol of entity and to send said part of said processed protocol data unit to said higher layer protocol entity as a service data unit, and to erase any other part of said protocol data unit.

4. The receiver apparatus as claimed in claim 2, characterized in that said intermediate layer is arranged as a medium access control layer for dedicated logical channels, wherein said higher layer protocol of entity is assigned to one of said dedicated logical channels.

5. The receiver apparatus as claimed in claim 1, characterized in that said lower layer is arranged as a medium access control layer for a high speed downlink shared channel, wherein said lower layer is adapted to receive said data units as service data units of said downlink shared channel.

6. The receiver apparatus as claimed in claim 5, characterized in that said higher layer is arranged as a radio link control layer.

7. The receiver apparatus as claimed in claim 2, characterized in that said lower layer is connected with said intermediate layer, that said lower layer is adapted to detect a channel identification number together with said sequence number for said higher layer protocol entity from said data unit buffered in said reordering buffer and to send said channel identification number to said intermediate layer over said connection, and that said intermediate layer is adapted to send said next expected sequence number for said higher layer protocol entity in response to said channel identification number sent to said intermediate layer from said lower layer.

8. The receiver apparatus as claimed in claim 7, characterized in that said intermediate layer is connected with said higher layer protocol entity, that said intermediate layer is adapted to send a request for a sequence number to said higher layer protocol entity assigned to said channel identification number over said connection with the higher layer protocol entity, and that said higher layer protocol entity is adapted to send said next expected sequence number to said intermediate layer in response to said request from said intermediate layer.

9. The receiver apparatus as claimed in claim 2, characterized in that said lower layer is connected with said higher layer protocol entity, that said lower layer is adapted to detect a channel identification number together with said sequence number for said higher layer protocol entity from said data unit buffered in said reordering buffer and to send said channel identification number to said higher layer protocol entity over said connection, and that said higher layer protocol entity is adapted to send said next expected sequence number of said higher layer protocol entity in response to said channel identification number sent from said lower layer to said higher layer protocol entity, when said channel identification number received from said lower layer equals a channel identification number of said higher layer protocol entity.

10. The receiver apparatus as claimed in claim 9, characterized in that said higher layer protocol entity is connected with said intermediate layer, that said higher layer protocol entity is adapted to send a request for said channel identification number of said higher layer protocol entity to said intermediate layer over said connection with said intermediate layer, that said intermediate layer is adapted to send said channel identification number of said higher layer protocol entity to said higher layer protocol entity in response to said request from said higher layer protocol entity.

11. A receiving method for receiving data units over at least a channel, said receiving method comprises the steps of:
receiving a data unit over said channel;
buffering said data unit as a protocol data unit of a lower layer;
determining, whether the protocol of data unit is a next expected protocol data unit of the lower layer or not;
outputting at least a part of said data unit buffered as a service data unit to a higher layer, when said protocol data unit is said next expected protocol data unit;
detecting a sequence number for a higher layer protocol entity in said protocol data unit buffered; and
outputting at least a part of said data unit buffered as a service data unit at least indirectly to said higher layer protocol entity, when said sequence number detected equals a next expected sequence number for said higher layer protocol entity.

* * * * *